United States Patent [19]

Kato

[11] 4,220,228

[45] Sep. 2, 1980

[54] HYDRAULIC DAMPER

[75] Inventor: Tetuo Kato, Musashino, Japan

[73] Assignee: Tokico Ltd., Kawasaki, Japan

[21] Appl. No.: 8,342

[22] Filed: Jan. 31, 1979

[30] Foreign Application Priority Data

Feb. 6, 1978 [JP] Japan ............................. 53-13499[U]

[51] Int. Cl.² ............................................. F16F 9/34
[52] U.S. Cl. ................................ 188/319; 137/625.32;
251/209
[58] Field of Search ............... 188/319, 278, 299, 300;
137/625.3, 625.31, 625.32; 251/208, 209

[56] References Cited

U.S. PATENT DOCUMENTS

| | | | |
|---|---|---|---|
| 1,015,164 | 1/1912 | Fowden | 251/209 X |
| 1,139,162 | 5/1915 | Chapman | 251/209 X |
| 2,347,803 | 5/1944 | Allen et al. | 188/278 |

FOREIGN PATENT DOCUMENTS

| | | | |
|---|---|---|---|
| 1297054 | 5/1962 | France | 188/299 |
| 212643 | 3/1924 | United Kingdom | 188/319 |
| 424024 | 2/1935 | United Kingdom | 137/625.3 |
| 740808 | 11/1955 | United Kingdom | 251/209 |

Primary Examiner—George E. A. Halvosa
Attorney, Agent, or Firm—Wenderoth, Lind & Ponack

[57] ABSTRACT

A hydraulic damper has a cylinder containing oil therein, a piston slidably fitted in the cylinder, a hollow piston prd extending from one side of the piston and projecting out of the cylinder, a tubular member mounted on the other side of the piston with the interior thereof communicating with the interior of the hollow piston rod, a connecting passage including the interior of the hollow piston rod and the interior of the tubular member and placing the opposite sides of the piston in communication, an actuating rod rotatably extending through the piston rod and being operable from the outside of the cylinder, and a valve body slidably received in the tubular member and connected to the actuating rod for changing the effective area of the connecting passage.

1 Claim, 3 Drawing Figures

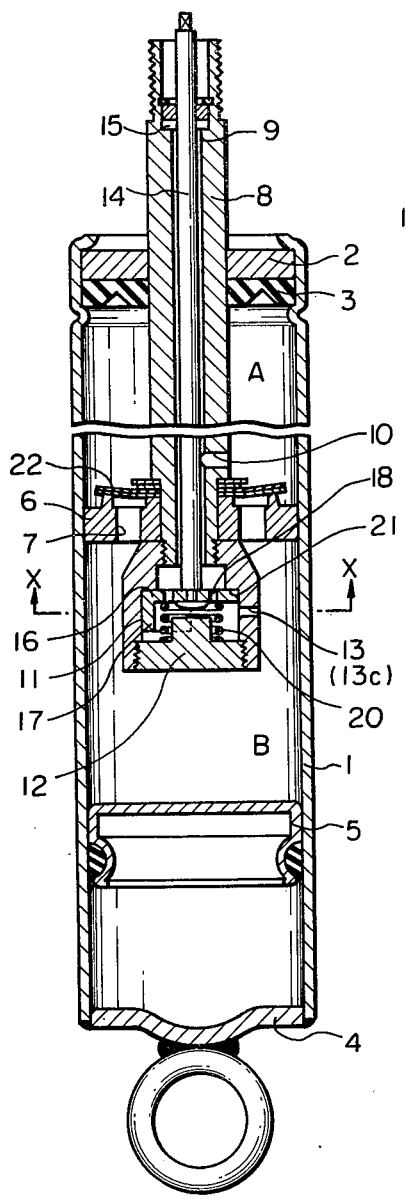
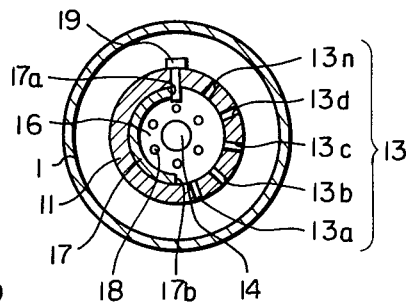
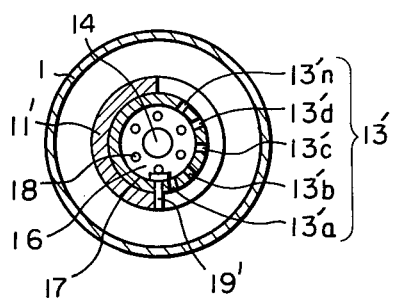

HYDRAULIC DAMPER

BACKGROUND OF THE INVENTION

This invention relates to a hydraulic damper and more particularly to improvements in hydraulic dampers of the type wherein the resisting force can be adjusted from the outside of the dampers.

One of the prior art hydraulic dampers of this type comprises a hollow piston rod with an adjusting or actuating rod inserted through the hollow portion thereof, and a valve body connected to the actuating rod for opening or closing orifices for generating the resisting force, whereby, the resisting force can be adjusted by rotatably actuating the actuating rod from the outside so as to open or close the orifices by means of the valve body.

In the hydraulic dampers of this type, the orifices have usually been formed in the piston rod; however, there are shortcomings to this arrangement in that the range of the adjustment is relatively narrow since the effective area of the orifices cannot be increased very much because of the limitation in the diameter of the piston rod and of the hollow configuration.

Moreover, there is a further shortcoming in that it is difficult to know what the respective adjusted conditions are from the outside, and it has been difficult to provide a suitable device for indicating the respective adjusted conditions since the actuating rod of this type of prior art hydraulic damper is adapted to rotate through 360 degrees.

SUMMARY OF THE INVENTION

An object of the present invention is to provide a hydraulic damper eliminating the shortcomings described above. This is achieved by a hydraulic damper according to the present invention which comprises a cylinder containing oil therein, a piston slidably fitted in the cylinder, a hollow piston rod extending from one side of the piston and projecting out of the cylinder, a tubular member mounted on the other side of the piston with the interior thereof communicating with the hollow portion of the piston rod, a connecting passage including the hollow portion of the piston rod and the interior of the tubular member and placing the opposite sides of the piston in communication, an actuating rod rotatably inserted in the hollow portion of the piston rod and being operable from the outside of the cylinder, and a valve body slidably received in the tubular member and connected to the actuating rod for opening or closing a part of the connecting passage.

BRIEF DESCRIPTION OF THE DRAWINGS

The present invention will be better understood by reference to the accompanying drawing illustrating two preferred embodiments of the present invention, in which:

FIG. 1 is a longitudinal section of a hydraulic damper constituting an embodiment of the present invention;

FIG. 2 is a cross-sectional view taken along line X—X of FIG. 1; and

FIG. 3 is a view similar to FIG. 2 but showing another embodiment of the present invention.

DETAILED DESCRIPTION OF THE EMBODIMENTS

The hydraulic damper shown in FIG. 1 comprises a cylinder 1 one end of which is closed by a rod guide 2 and a seal ring 3 and the other end of which is closed by a cap 4. In the interior of the cylinder 1 there is contained gas and oil which are separated by a free piston 5.

A piston 6 is slidably fitted in the oil receiving portion of the cylinder 1 and partitions the oil receiving portion of the cylinder 1 into two chambers A and B. A passage 7 is formed in the piston 6 for placing the chambers A and B in communication.

A piston rod 8, which has an axial bore 9 throughout its axial length extends from one side or the upper side, in this embodiment the piston 6, through the oil chamber A, slidingly and oil-tightly through the rod guide 2 and the seal ring 3, and to the outside of the cylinder 1. An opening 10 is formed in the piston rod 8 at a position adjacent to the piston 6 for placing the bore 9 in communication with the oil chamber A.

A tubular member 11 is mounted on the other side, in this embodiment the lower side, of the piston 6 and projects into the chamber B and, in the embodiment, the member 11 acts also as a nut connecting the piston 6 with the piston rod 8. The interior of the tubular member 11 is in communication with the hollow portion 9 of the piston rod 8 at the end adjacent to the piston 6 and, the other or the lower end thereof is closed by a plug 12. The tubular member 11 has a plurality of orifices 13a, 13b, 13c, . . . 13n (together depicted by a numeral 13) which place the interior of the tubular member 11 in communication with the oil chamber B.

Thus, the hollow portion 9 of the piston rod 8, the opening 10, the interior of the tubular member 11, and the orifice 13 constitute a connecting passage placing the chambers A and B in communication with each other. The orifice 13 constitutes a part of the connecting passage.

An actuating rod 14 is rotatably positioned in the hollow portion 9 of the piston rod 8 and does not close the connecting passage and the upper end of the rod 14 extends in oil tight relation through a seal ring 15 to the outside of the hollow portion 9 of the piston rod 8 and the lower end thereof extends into the tubular member 11.

A valve body is rotatably mounted in the tubular member 11 and is rigidly connected to the lower end of the actuating rod 14. The valve body 16 has a generally cup-shaped configuration with half the cylindrical side wall being cut off. The remaining side wall constitutes a valve portion 17 and cooperates with the orifices 13. A plurality of openings 18 are formed in the bottom portion of the cup to act as a portion of the connecting passage.

A stop 19 is mounted on the tubular member 11 and is engageable with the circumferential end surfaces 17a, 17b of the valve portion 17 of the valve body 16 and thus restricting the range of the rotational movement and the valve body 16 or the actuating rod 14 to an angle of about 180°. As clearly shown in FIG. 2, when one of the end surfaces 17a engages with the stop 19 the valve portion is in a position in which all of the orifices 13a, 13b, 13c, . . . and 13n are open, and when the valve portion 17 is rotated in the counter clockwise direction in FIG. 2 the orifices 13a, 13b, . . . will be sequentially closed. And when the other end surface 17b engages with the stop 19, the valve portion 17 closes all of the orifices 13a, 13b, . . . 13n.

A spring 20 extends between the plug 12 and the valve body 16 for biassing the valve body 16 against a shoulder portion 21 within the tubular member 11 thus maintaining a predetermined relative position of the piston rod 8 and the tubular member 11 with respect to the actuating rod 14 and the valve body 16 in the axial direction.

A valve disc 22 of the well-known type is mounted on the piston 6 and operates such that when the piston 6 reciprocatingly moves in the cylinder 1 and the pressure in the chamber A or B exceeds a predetermined level, the disc 22 deflects and the chambers A and B are placed in communication with one another through the passage 7, the valve disc 22 thus constituting a part of the resistance generating mechanism of the hydraulic damper.

As described heretofore, the number of orifices 13 which are open which constitute the effective area of the connecting passage can easily be adjusted by rotating the rod 14 from the outside of the damper, whereby the resisting force generated in the hydraulic damper can easily be adjusted.

Since the orifices 13 are formed in a tubular member 11 and not in the piston rod 8, the effective area thereof can be increased thereby increasing the range of the adjustment.

Further, the valve body 16 can not rotate through 360° because of the stop 19 and the valve body 16, and the range of the rotation is limited to a predetermined angle, whereby the adjusted condition can easily be indicated by marking "much" or "less" in connection with the resisting force and with the rotational direction of the actuating rod 14.

The present invention may include the following modifications.

(a) The tubular member 11 can be integrally formed on the piston 6 and, the piston 6 connected to the piston rod 8 by means of a nut or the like.

(b) The orifice 13 need not be constituted by a plurality of openings but can be a slot or the like extending in the circumferential direction of member 11 whereby the adjustment can be effected continuously.

(c) As shown in FIG. 3, half of the circumference of the side wall of the tubular member 11' is cut off and a plurality of orifices 13'a, 13'b, . . . 13'n are formed in the side wall of the cup-shaped valve body 16'. (The relationship between the tubular member 11' and the valve body 16' with respect to the orifices is reversed as compared with the embodiment of FIGS. 1 and 2). The stop 19' is mounted on the valve body 16', and the plug 12 closes the lower end of the valve body 16'.

I claim:

1. A hydraulic damper comprising: a cylinder containing oil therein; a piston slidably fitted in said cylinder; a hollow piston rod extending from one side of said piston and projecting out of said cylinder and extending through said piston, said hollow piston rod having a transverse opening on said one side of said piston; a tubular member having a stepped bore with a small diameter portion adjacent said piston and a large diameter portion remote from said piston and a shoulder therebetween, and said larger diameter portion having a wall therearound, said tubular member having one end threaded to the end of said piston rod on the other side of said piston for closing said small diameter portion and securing said piston to said piston rod and with the interior of said tubular member in communication with the interior of said hollow piston rod; a plug closing the end of the larger diameter portion of said tubular member; an actuating rod rotatably extending from within said tubular member through said piston and through said hollow piston rod and having a diameter less than the internal diameter of said hollow piston rod for leaving an annular space around said actuating rod, said actuating rod being operable from outside of said cylinder for rotating it; a valve body having an apertured disc-shaped bottom rigidly connected to the end of said actuating rod within said tubular member and slidably contacting said shoulder and having a depending side wall slidable against the wall of said large diameter portion, one of said walls having a plurality of circumferentially spaced openings therein and the other wall having at least one opening therein, the opposite sides of said piston being in communication through said transverse opening, said annular space, the interior of said tubular member and said openings in said walls; and a stop secured to one of said valve body and said tubular member and engaging the other for restricting the relative rotation between the valve body and the tubular member to an angle not exceeding about 180°.

* * * * *